US009100059B2

(12) United States Patent
Zehler

(10) Patent No.: US 9,100,059 B2
(45) Date of Patent: Aug. 4, 2015

(54) SYSTEM AND METHOD FOR MAPPING MULTIPLE APPLICATIONS TO A SINGLE NFC TAG

(71) Applicant: Xerox Corporation, Norwalk, CT (US)

(72) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 126 days.

(21) Appl. No.: 13/888,528

(22) Filed: May 7, 2013

(65) Prior Publication Data

US 2014/0333419 A1    Nov. 13, 2014

(51) Int. Cl.
| H04Q 5/22 | (2006.01) |
| H04B 5/00 | (2006.01) |
| H04B 7/00 | (2006.01) |
| G06F 3/12 | (2006.01) |
| H04N 1/00 | (2006.01) |
| H04W 4/00 | (2009.01) |
| G06K 7/00 | (2006.01) |
| G06F 9/445 | (2006.01) |
| G06K 7/10 | (2006.01) |

(52) U.S. Cl.
CPC .......... *H04B 5/0056* (2013.01); *G06F 9/44505* (2013.01); *G06K 7/0008* (2013.01); *H04B 5/0031* (2013.01); *H04W 4/008* (2013.01); *G06K 7/10237* (2013.01)

(58) Field of Classification Search
CPC  H04B 5/0031; H04B 5/0056; G06F 9/44505; G06F 3/1267; G06F 3/1292; G06F 3/1204; H04W 4/008; H04W 4/20; H04W 4/00; G06K 7/0008; G06K 7/10237; G06Q 20/223; G06Q 20/327; G06Q 20/3278; H04M 2250/10; H04M 2250/04; H04N 1/32

USPC ............ 340/10.51, 10.5, 573.1, 5.7, 5.2, 7.2, 340/5.21, 5.8, 505, 855.3; 455/41.3, 466, 455/550.1, 418, 41.2, 410, 41.1, 556.1; 235/375, 380, 382; 713/169, 170; 358/1.1, 425; 705/26.81, 62

See application file for complete search history.

(56) References Cited

U.S. PATENT DOCUMENTS

| 8,060,012 | B2 | 11/2011 | Sklovsky et al. | |
| 8,229,354 | B2 | 7/2012 | Sklovsky et al. | |
| 2003/0187784 | A1* | 10/2003 | Maritzen et al. | 705/39 |
| 2008/0238610 | A1* | 10/2008 | Rosenberg | 340/5.7 |
| 2009/0247078 | A1* | 10/2009 | Sklovsky et al. | 455/41.1 |

(Continued)

OTHER PUBLICATIONS

U.S. Appl. No. 13/851,264, filed Mar. 27, 2013; entitled System and Method for Verifying Physical Proximity to a Network Device; Inventors: Gavan L. Tredoux, Peter J. Zehler, Premkumar Rajendran and Roger T. Kramer.

*Primary Examiner* — Mirza Alam

(74) *Attorney, Agent, or Firm* — Fay Sharpe LLP

(57) ABSTRACT

A method and system are disclosed for mapping multiple applications or services from a single tag. A tag is deployed in a product that stores multiple intent records, the first of which maps to a client multiplexing component. The client multiplexing component, resident on a user device, is automatically initiated upon establishment of a communications link between the user device and the tag. The client multiplexing component then reads each subsequent record on the tag and selectively launches the application or service on the user device. Any data to be written back to the tag is communicated from the corresponding application or service through the client multiplexing component.

21 Claims, 5 Drawing Sheets

(56) References Cited

U.S. PATENT DOCUMENTS

2010/0293613 A1* 11/2010 Hum .............................. 726/20
2011/0070834 A1* 3/2011 Griffin et al. ................ 455/41.1
2013/0229687 A1* 9/2013 Yamauchi .................... 358/1.15

* cited by examiner

SYSTEM AND METHOD FOR MAPPING MULTIPLE APPLICATIONS TO A SINGLE NFC TAG

BACKGROUND

The subject disclosure is directed to the near field communications arts, the communications arts, the service providing arts, the radio communications arts, the mobile computing arts, document processing arts, and the like.

Near field communications ("NFC") is a set of standards for smartphones and similar portable user devices to establish radio communication with each other by touching them together or bringing them into close proximity, e.g., a few centimeters. The short-range wireless technologies employed in NFC operations typically require a distance of 10 cm or less. NFC requires an initiator and a target, with the initiator capable of actively generating an RF field that can power a passive target or communicate with an active target. This arrangement allows for the use of targets having a very simplistic form, such as tags, key fobs, stickers, cards, etc., which do not require batteries. NFC tags may be read-only or rewriteable, and may be custom encoded. NFC tags may be configured to provide various communication speeds, memory, security, data storage, write endurance, etc. In some instances, the target may include a power source, e.g., NFC peer-to-peer communications, commonly referred to as NFC chips.

NFC tags are inexpensive and can be placed on a product without integrating NFC with the underlying product. Data can be written to an NFC tag that describes an intent. When an NFC enabled device "taps" or otherwise is brought into proximity with an NFC tag, it causes an application to be launched on the NFC enabled device to handle that intent. However, a severe limitation exists with respect to the usage of NFC tags: to make use of this automatic launch feature, the NFC tags are single purposed. That is, the data stored on them are associated with a single intent. When the NFC tag is tapped or establishes a communication channel with an NFC enabled device, the device's NFC dispatch system locates the appropriate application and launches it. There may be multiple applications that can satisfy the intent, but that set of applications are homogenous. For example, if the intent is to visit a web page and the device has multiple web browsers available, the user is presented with a choice as to which browser to use. If no application is associated with the intent, some systems query an application repository to locate an appropriate application. Furthermore, the aforementioned set of homogenous applications cannot implement completely different types of logic (e.g., asset management as opposed to client network configuration). In order to change the client behavior associated with the NFC tag, new data must be written, such that the next time an NFC enabled device taps or establishes a communications link with the tag, the new data will be read and a different application may be launched.

There are some uses of NFC tags that would benefit from multiple intents on a single NFC tag. For example, it would be useful to have a tag that could have both asset information for an inventory application and connectivity information to simplify the configuration of user devices for network connectivity. The current solution for enabling multiple intents is to use multiple tags.

However, the use of multiple tags can be problematic, for example when a manufacturer or user desires to have a single NFC "touch point" in the manufacturing of a product, but allow for multiple behaviors for NFC enabled devices. It may also be problematic for products with limited space on which to place NFC tags. Multiple tags may be a barrier to ease of use. If multiple NFC tags are used, an end user will have to examine the various touch points to determine the one that matches the current need. Thus, the ability to utilize a single tag would simplify user interactions. With respect to the usage of multiple tags, custom device resident software may be developed allowing examination of the device's current context to determine the user's current need and if the NFC Tag can cause the launch an appropriate application to satisfy that need.

Additional attempts to alleviate the aforementioned issues with multiple tag usage involve the use of an active NFC chip that can programmatically changes its data, but this is not practical in the majority of situations due to the relatively high unit cost. Furthermore, a user's current need is part of the user device's context and is unknown when the user's device touches the NFC chip. Currently, the sender, i.e., the entity acting as the NFC tag, launches an application that establishes the context for the NFC chip. Any NFC enabled device will see the NFC chip as an NFC tag with an intent associated with the sender's running application.

Thus, it would advantageous to provide a system and method that uses a single near field communication tag to specify multiple intents.

INCORPORATION BY REFERENCE

The following references, the disclosures of which are incorporated herein by reference, in their entirety, are mentioned.

U.S. Pat. No. 8,229,354 issued Jul. 24, 2012, entitled METHOD AND APPARATUS FOR AUTOMATIC APPLICATION SELECTION IN AN ELECTRONIC DEVICE USING MULTIPLE DISCOVERY MANAGERS, by Vladimir Sklovsky, and Thomas Buhot.

U.S. Pat. No. 8,060,012 issued Nov. 15, 2011, entitled METHOD AND APPARATUS FOR AUTOMATIC NEAR FIELD COMMUNICATION APPLICATION SELECTION IN AN ELECTRONIC DEVICE, by Vladimir Sklovsky, Yan Bertrand, and Thomas Buhot.

U.S. patent application Ser. No. 13/851,264, filed Mar. 27, 2013, entitled SYSTEM AND METHOD FOR VERIFYING PHYSICAL PROXIMITY TO A NETWORK DEVICE, by Gavan Tredoux, Peter Zehler, Premkumar Rajendran and Roger T. Kramer.

BRIEF DESCRIPTION

In one aspect of the exemplary embodiment, method for mapping multiple applications from a single tag is provided. The method includes establishing, via a user device, a communications link with the tag, the tag storing a plurality of records, each record corresponding to an application or a service. The method further includes initiating a multiplexing component on the user device responsive to a first record of the plurality thereof. The method also includes analyzing each additional record of the plurality of records by the multiplexing component on the user device. In addition, the method includes selectively initiating, via the multiplexing component, at least one application or service responsive to at least one additional record on the user device.

In another aspect, a system for mapping multiple applications from a single tag is provided. The system includes a user device, which has a client multiplexing component configured to interact with an associated tag. The tag includes a plurality of intent records, with each record corresponding to at least one of an application or a service, and with the first record corresponding to the client multiplexing component. The system also includes memory which stores instructions for establishing a bi-directional communication link with the associated tag, and initiating the client multiplexing component in response to reading the first record stored on the associated tag. The memory also stores instructions for selectively initiating at least one of an application or a service by the client multiplexing component in response to at least one record on the associated tag corresponding thereto. The system further includes a processor in communication with the memory which executes the instructions.

In another aspect, a computer-implemented method for mapping multiple applications from a single tag is provided. The method includes receiving, by a user device having a processor, a first record stored on an associated tag via a near field communications connection, the first record associated with a client multiplexing component. The method also includes initiating the client multiplexing component on the user device, and reading a subsequent record on the associated tag by the client multiplexing component, the subsequent record corresponding to at least one of an application or a service. In addition, the method includes initiating the at least one of an application or a service on the user device by the client multiplexing component responsive to the read subsequent record.

DETAILED DESCRIPTION

Figure 1:
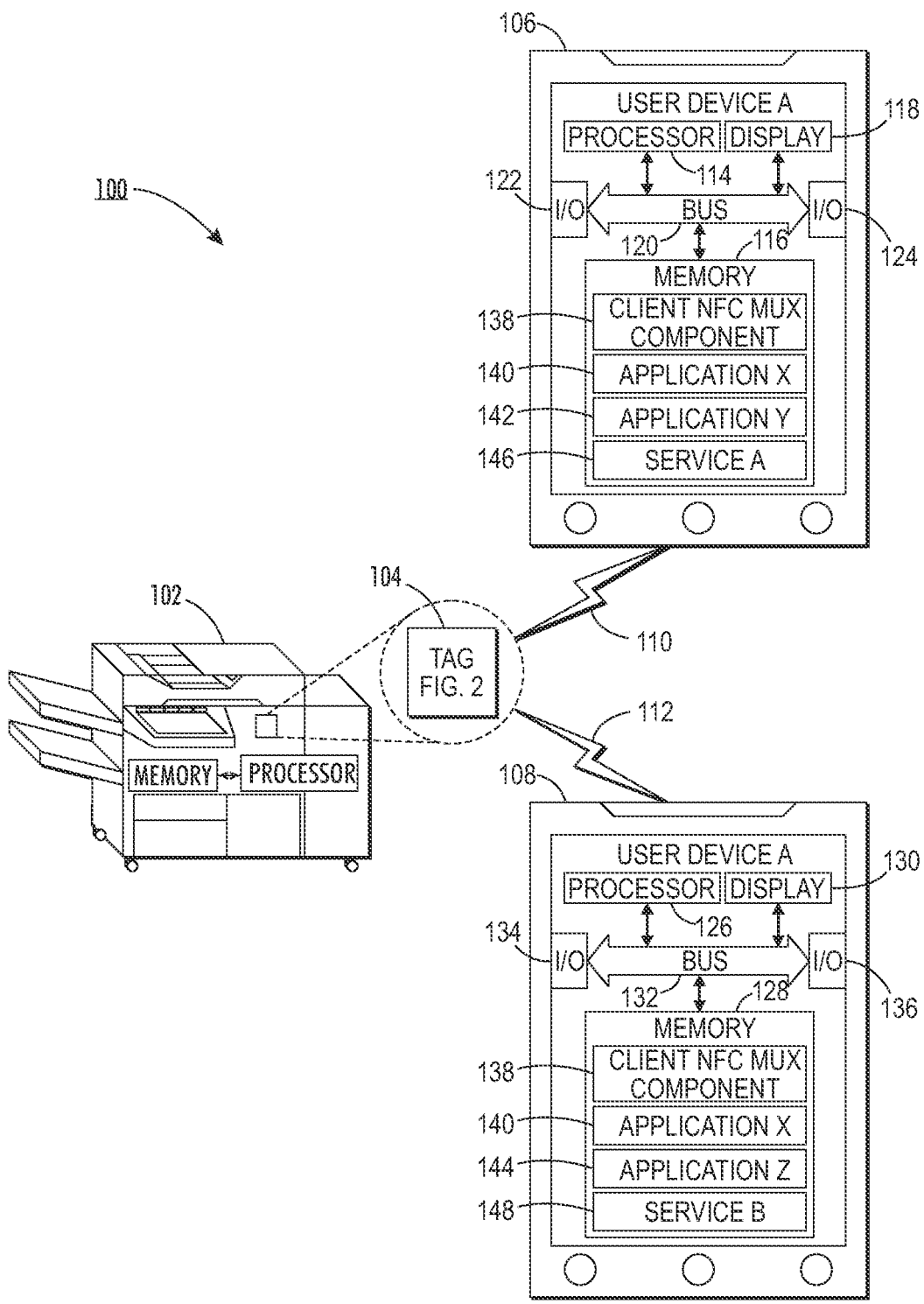
FIG. 1 is a functional block diagram of a system for mapping multiple applications to a single tag in accordance with one aspect of the exemplary embodiment.

One or more embodiments will now be described with reference to the attached drawings, wherein like reference numerals are used to refer to like elements throughout.

In one aspect, a method is provided for mapping multiple applications to a single tag. The tag, which may be a near field communications (NFC) tag, is capable of being affixed to a product during the manufacture or distribution of the product. A single tag may be programmed with several intents, i.e., records, which contain data, information, links, or instructions for an application or service on an NFC enabled device, such as a smart phone. The first record on the tag may include instructions to launch a multiplexing component or application on the NFC enabled device. The multiplexing component is configured to handle all communications with the tag, reading each record, identifying applications or services to be launched, data to be retrieved, data to be written, and the like. Each subsequent record stored on the tag may direct the launching or performance of an action by disparate applications, allowing a single touch point (i.e., the tag) on a product to launch multiple applications.

An "NFC tag" includes a low-cost Near Field Communication (NFC) small device, powered or unpowered, which is capable of communication with an NFC-enabled user device over a short distance, e.g., up to 10 cm, which can be affixed to a product, article, or the like, as illustrated and discussed with respect to FIG. 2 below.

"User device" or "mobile device" denotes an NFC enabled device owned by a user and able to use a "client NFC multiplexer (MUX) component" for interacting with the NFC tag affixed to a "product". Examples of such a user device include, without limitation, mobile phones, personal data assistants, tablets, and other personal electronic devices. The user device may be NFC-enabled, as well as capable of data communication with one or more wired or wireless networks, as discussed with respect to FIG. 1 below.

A "client NFC multiplexing (MUX) component" denotes a component or application resident on a user device and capable of interacting with an NFC tag, controlling the reading and writing of records thereto, and the like. The client NFC MUX component may be implemented on a plurality of user devices, and configured to read "records" on an NFC tag corresponding to various applications or services on the device, facilitate initiation of such services and applications, and control interactions of the applications or services with respect to the NFC tag.

A "product" denotes any article of manufacture in which an NFC tag is deployed. In particular embodiments discussed herein, the product denotes a multifunction device (MFD) capable of performing a variety of services to an associated user, e.g., printing, scanning, facsimile, email, network storage, etc. It will be appreciated that while illustrated with respect to a document management device, other articles are capable of employing the NFC tag, e.g., ticketing applications, merchant applications, library applications, medical applications, and the like.

A "record" corresponds to an intent stored on the NFC tag representing an instruction to launch a particular application or service, an instruction to process data by a particular application or service, an instruction for some operation or action to be taken by a particular application or service, an instruction requesting data from a particular application or service, or the like. The records may be stored in memory of the NFC tag and be read and written to by a specified application or component, such as the client NFC MUX component. Each record may contain data indicating a location of where an application or service may be found for installation on a device, where an application or service may located on the device, data for the associated application (e.g., the serial number of the product for an inventory application), or the like. The NFC tag may store multiple records, each of which maps to a particular component, application or service, as discussed in detail below with respect to FIGS. 1-4.

It will be appreciated that the systems and methods set forth herein are independent from both cellular telephone manufacturers and cellular phone network operators, based upon the use of the NFC standard. Additionally, the systems and methods are also independent of the SIM card capability and of mobile phone security services. The systems and methods further provide robust interoperability for the user between a large variety of products and service providers, requiring a user to install a single client NFC multiplexing component that is capable of interacting with tags installed across multiple different devices and services. Thus, the subject systems and methods provide low cost unconnected and optionally unpowered tags as infrastructure investment; the NFC standards enable implementation across any type of NFC enabled mobile devices; and the system does not rely on the mobile SIM-card and is therefore independent from the mobile network operator.

It will further be appreciated that while illustrated in FIG. 1 as implemented with respect to a document processing environment, the systems and methods set forth hereinafter are equally adaptable and contemplated to extend to any product or implementation wherein an NFC tag is utilized. For example, the system may be implemented to allow interactions between mobile devices and vending or servicing devices, ticketing devices, tracking devices, medical equipment, parking devices, and the like. Accordingly, while described below with respect to a multifunction device setting, it will be appreciated that myriad environments are capable of utilizing the systems and methods now set forth.

Referring now to FIG. 1, there is shown a system 100 for mapping multiple applications to a single tag. FIG. 1 illustrates an example implantation in the form of a multifunction device that provides multiple services and features to users. Other embodiments may include implementation on varying networks, such as vendor applications, packaging applications, medical applications, and the like. It will be appreciated that the various components depicted in FIG. 1 are for purposes of illustrating aspects of the exemplary embodiment, and that other similar components, implemented via hardware, software, or a combination thereof, are capable of being substituted therein.

As shown in FIG. 1, the system 100 for mapping multiple applications to a single tag includes a multifunction device 102, a near field communications (NFC) tag 104, and a plurality of user devices, illustrated in FIG. 1 as user device A 106 and user device B 108. It will be appreciated that while illustrated in FIG. 1 with respect to a multifunction device 102, the tag 104 may be affixed to a structure (e.g., counter, door frame, etc.), furniture (e.g., desk, table, etc.) or the like. In varying embodiments described herein, the multifunction device 102 includes at least a processor and associated memory, which together function to control overall operations of the multifunction device 102. Accordingly, the multifunction device 102 is configured to perform a variety of functions, e.g., photocopying, printing, scanning, electronic communications, facsimile transmissions, and the like.

The multifunction device 102 depicted in the system 100 illustrated in FIG. 1 may include an NFC tag 104, deployed in any suitable location on or near the device 102. It will be appreciated that the tag 104 may be internally affixed to the device 102 during manufacture of the device 102, during installation of the device 102 in a suitable operating environment, or affixed to a furnishing or structure proximal to the device 102, e.g., table, wall, counter, etc. It will further be appreciated that the NFC tag 104 is located at a position on the multifunction device 102 that is suitably convenient to interact with a user device 106-108. For example, the NFC tag 104 may be located in proximity to the user interface of the device 102, which is of an appropriate height for a corresponding user. That is, the tag 104 is positioned to provide easy access thereto for a user based upon the height of the device 102, the relative height of the users, the lack of obstructions between the tag 104 and any user device 106, 108, and the like. FIG. 2 provides a functional block diagram of an exemplary tag 104 of FIG. 1.

Figure 2:
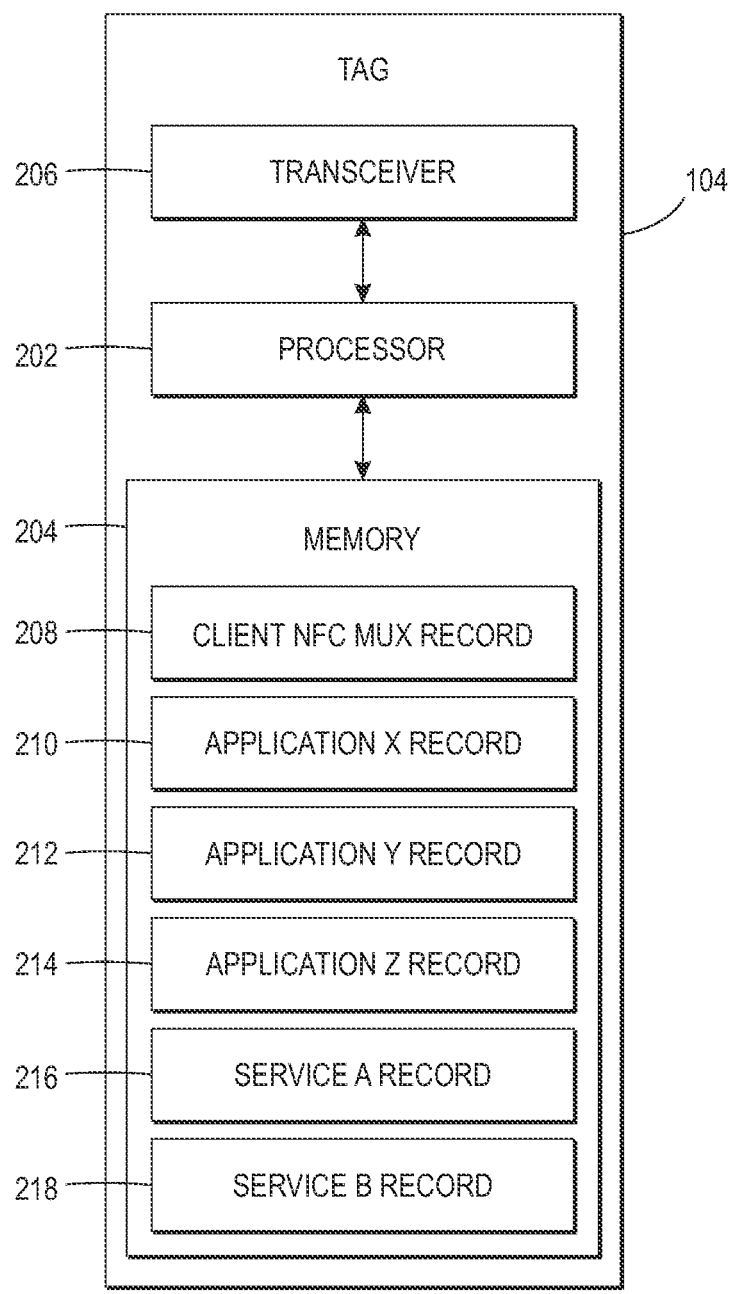
FIG. 2 is a functional block diagram of a tag used in the system for mapping multiple applications to a single tag in accordance with one aspect of the exemplary embodiment.

Turning now to FIG. 2, the NFC tag 104 may be powered (self-contained power supply, not shown) or unpowered (shown in FIG. 2). The tag 104 includes a processor 202 in communication with memory 204 and a transceiver 206. The processor 202 may include a random number generator and other suitable components to facilitate the systems and methods discussed hereinafter. The memory 204 may comprise non-volatile and/or volatile memory capable of storing various types of data. The tag 104 may utilize symmetric cryptography (3DES, AES, etc.) or asymmetric cryptography (RSA, ECC, etc.). The memory 204 may include a plurality of records, as utilized in NFC tags. In accordance with one embodiment, each record may correspond to an instruction or intent for some corresponding service or application of a user device 106 and/or 108 to activate or perform an action.

As shown in FIG. 2, the memory 204 may include a client NFC multiplexer (MUX) record 208 associated with an instruction to launch or otherwise activate the client MUX component 138 of a user device 106, 108 in communication with the tag 104. According to one embodiment, the client NFC MUX record 208 is the first record to be accessed or communicated during any NFC exchange with a user device 106 and 108. That is, upon establishing a communications link utilizing NFC, the NFC dispatching logic of the tag 104 dictates that the first record, the client NFC MUX record 208, is communicated to the user device 106 and 108, which initiates the client NFC MUX component 138 resident thereon.

The memory 204 may also include one or more additional or subsequent intent records, each of which is associated With a particular application or service representative of an intent or action to be undertaken by a user device 106 and/or 108. As shown in FIGURE, the memory 204 includes an application X intent record 210 corresponding with some data or action associated with an application X 140 on an associated user device 106, 108. For example, the record 210 may correspond to some document processing application, wherein the application 140 initiated on the user device 106 or 108 communicates settings and user information to the multifunction device 102 so as to enable quick completion of an operation of the multifunction device 102 by the user associated with the user device 106 or 108.

The memory 204 may include an application Y intent record 212 corresponding to data or an action to be taken with respect to application Y 142 resident on a user device A 106, an application Z intent record 214 corresponding to data or an action to be taken with respect to an application Z 144, a service A intent record 216 corresponding to data or an action to be taken via a service A 146, and a service B intent record 218 corresponding to data or an action to be taken via a service B 148 resident on a user device B 108. It will be appreciated that the intent records 210-212 may include data to be read by the MUX component 138, data that is to be written and stored on the tag 104 by the MUX component 138 corresponding to the respective application 140-144 or service 146-148.

Returning to FIG. 1, one or more user devices 106 and 108 may be in intermittent communication with the NFC tag 104 via respective communication links 110 and 112. That is, the user devices 106 and 108 may utilize short-range communication channels with the tag 104. In one embodiment, each user device 106 and 108 may be implemented as a smartphone employing an operating system such as iOS, ANDROID, BLACKBERRY, WINDOWS, or the like, or any device having NFC capabilities. The user devices 106-108 are representative of any personal computing devices, such as personal computers, netbook computers, laptop computers, workstation computers, personal data assistants, web-enabled cellular telephones, tablet computers, proprietary network devices, or other web-enabled electronic devices.

As shown in FIG. 1, the user device A 106 may include a processor 114, which executes one or more instructions or applications 138, 140, 142, 146 in the performance of an exemplary method discussed below. The user device A 106 may further include a memory 116 storing the instructions or applications 138, 140, 142, 146 in data communication with the processor 114 via a system bus 120. The processor 114 of the user device A 106 may be in data communication with a backend system or cellular network, or the like, via an I/O interface 124. In one embodiment, such communication may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

The user device A 106 may be in data communication with the NFC tag 104 via an I/O interface 122. In one embodiment, the I/O interface 122 is implemented as a short-range communication component, such as, for example an NFC component. In such an embodiment, the I/O interface 122 may be configured to provide power to the tag 104 to enable communication therebetween. In other embodiments, the short range communication component may be implemented using any suitable short range communications protocol, and the use of NFC protocols is for example purposes only. The user device A 106 may further include a display 118 suitably configured to display data to an associated user, receive input from the associated user, and the like. In some embodiments, the display 118 of the user device A 106 may be configured as a touch-screen display capable of receiving user instructions via user contact on the display, e.g., LCD, AMOLED, LED, RETINA, etc., types of touch-screen displays.

The memory 116 of the user device A 106 includes the client NFC MUX component 138, which may be previously installed or retrieved from an exterior source, as discussed in greater detail below. As discussed in greater detail below with respect to FIGS. 3 and 4, the client NFC MUX component 138 facilitates communications with the tag 104 and various other applications 140-142 and services 146 stored in memory 116. According to one embodiment, the client NFC multiplexing component 138 is configured to read all the data that is on the tag 104 and then analyze the configuration of the user device A 106 to determine the type of device or identify the preferred application is for this particular device 106. It will then look through the records 210-218 and determine if there is any record associated with that type of application. It will then launch that application and pass the associated information on to it.

Figure 5:
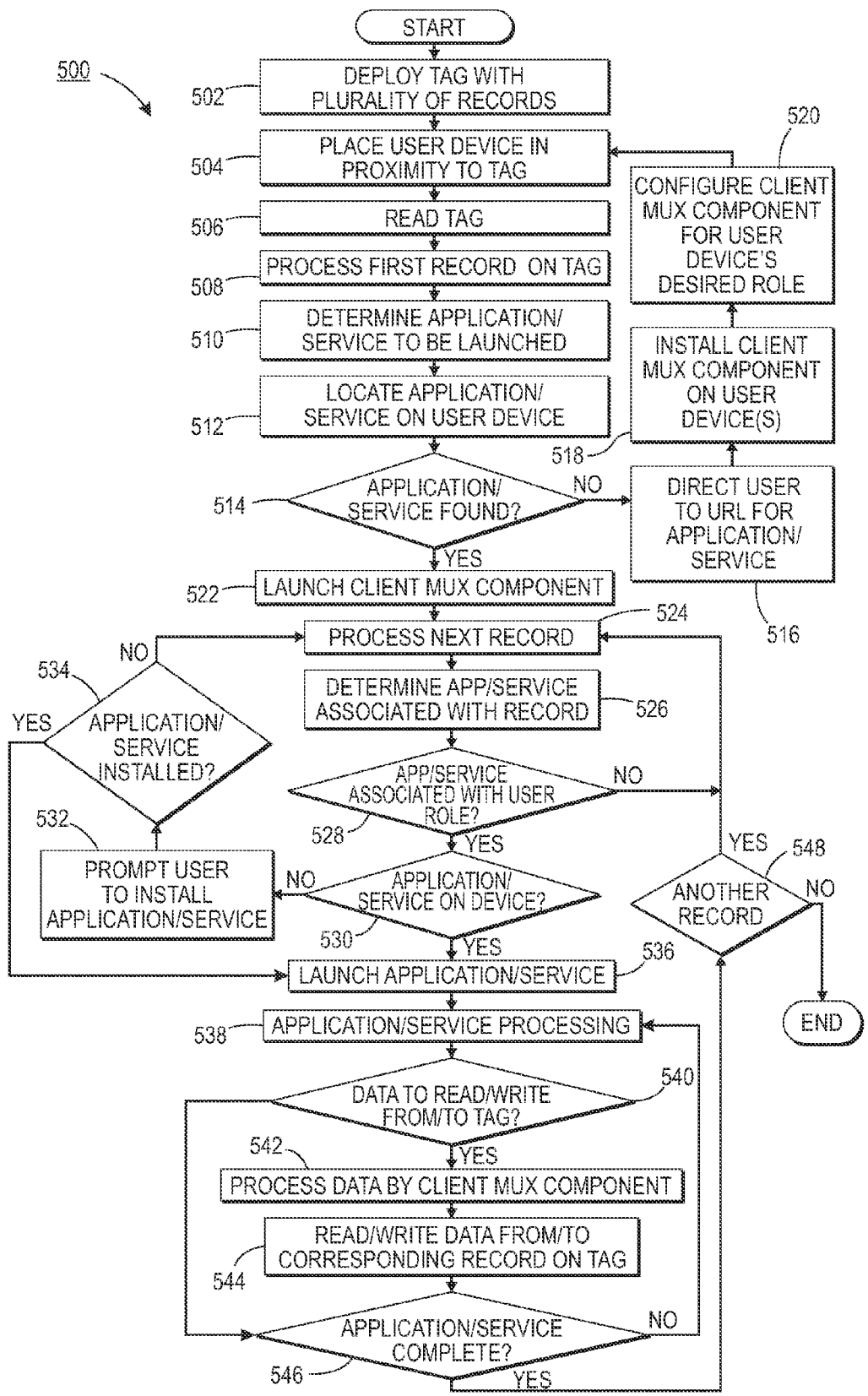
FIG. 5 is a flowchart that illustrates another aspect of the method for mapping multiple applications from a single tag according to an exemplary embodiment.

In accordance with another aspect of the embodiment discussed herein, the client NFC multiplexing component 138 can be configured to associate the user device A 106 (or user device B 108) with a particular role, e.g., an end user of document services, an administrator, maintenance person, etc. In such an aspect, the client NFC multiplexing component 138 can filter the records 210-218 read from the tag 104 to ignore any record 210-218 not associated with the role of the device 106 or 108, e.g., to log into the device or to submit a print job to the device. Other applications, e.g., retrieve usage information from the device, would not be invoked even if installed on the user device 106 or 108 because the role associated with the user device 106 or 108 is an end user and not an administrator. FIG. 5, discussed below, provides an example illustrating this aspect of the subject disclosure.

The user device B 108 may similarly be configured as discussed above with respect to user device A 106. Accordingly, the user device B 108 includes a processor 126 that executes one or more instructions or applications 138, 140, 144, and 148 in the performance of the exemplary method discussed with respect to FIGS. 3 and 4 below. The user device B 108 also includes memory 128 in communication with the processor 126 that stores the aforementioned instructions or applications 138, 140, 144, and 148.

The processor 126 of the user device B 108 may be in data communication with a backend system or cellular network, or the like, via an I/O interface 136. For example, the user device B 108 may be in communication with a network via a suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

As depicted in FIG. 1, the user device B 108 is capable of communicating with the NFC tag 104 via an I/O interface 134. According to one example embodiment, the I/O interface 134 is implemented as a short-range communication component, such as, for example an NFC component. The I/O interface 134 may be configured to supply power to the tag 104 to enable communication there between. As previously discussed with respect to the user device A 106, the short range communication component may be implemented using any suitable short range communications protocol, and the use of NFC protocols is for example purposes only.

The user device B 108 depicted in FIG. 1 may further include a display 130 suitably configured to display data to an associated user, receive input from the associated user, and the like. The display 130 of the user device B 108 may be configured as a touch-screen display capable of receiving user instructions via user contact on the display, e.g., LCD, AMOLED, LED, RETINA, etc., types of touch-screen displays.

As shown in FIG. 1, the memory 128 of the user device B 108 includes the client NFC MUX component 138, which may be previously installed or retrieved from an exterior source, as discussed in greater detail below. As discussed in greater detail below with respect to FIGS. 3 and 4, the client NFC MUX component 138 facilitates communications with the tag 104 and various other applications 140, 144 and services 148 stored in memory 128.

The memory 116 and 128 may represent any type of non-transitory computer readable medium such as random access memory (RAM), read only memory (ROM), magnetic disk or tape, optical disk, flash memory, or holographic memory. In one embodiment, the memory 116 and 128 comprises a combination of random access memory and read only memory. In some embodiments, the processor 114 and 126 and memory 116 and 128 may be combined in a single chip. The network interface(s) 122, 124, 134, 136 allow the user device A 106 and user device B 108 to communicate with other devices via a communications network, and may comprise a modulator/demodulator (MODEM). Memory 116 and 128 may store data the processed in the method as well as the instructions for performing the exemplary method. The digital processor 114 and 126 can be variously embodied, such as by a single core processor, a dual core processor (or more generally by a multiple core processor), a digital processor and cooperating math coprocessor, a digital controller, or the like.

As shown in FIG. 1, the user devices 106-108 are may be brought into proximity with the tag 104 to interact in some manner with the multifunction device 102, e.g., to log into the device 102, to retrieve usage information from the device 102, to submit a document processing job, or the like. Once in proximity, the I/O interfaces 122 and/or 134, i.e., the NFC component of the user device 106-108, may generate an RF field which is capable of powering the tag 104. The user device 106 or 108 then reads the tag 104 (establishes an NFC radio communication with the tag 104, i.e., the communications links 110, 112). The tag 104 and the user device 106 or 108 authenticate each other using standard NFC communications protocols. In one embodiment, the processor 114 or 126 in accordance with the client NFC MUX record 208 launches the client NFC component 138.

The NFC MUX component 138, in conjunction with the I/O interface 122 or 134 then processes the other records 210-218 stored on the tag 104. As each record 210-218 is read by the NFC MUX component 138, various determinations and actions associated with each record are undertaken. As discussed above, only one or a set of the additional records 210-218 may be acted upon based on the configuration of the user device 106 or 108, the role associated with the user device 106 or 108, the time of day, an arbitrary metric, and/or the like. For example, the NFC MUX component 138 resident on the user device A 106 may read each record 210-218 of the tag 104 to determine which records 210-218 correspond to application X 140, application Y 142 or service A 146 stored in memory 116. Based upon the presence of both the records and applications/services, the NFC MUX component 138 initiates application X 140, application Y 142 and service A 146 using data stored in the corresponding application X record 210, application Y record 212, and service A record 216 read from the tag 104. The NFC MUX component 138 may further analyze the remaining records application Z record 214 and service B record 218 on the tag 104 and prompt the user of the user device A 106 to install the corresponding application or service into memory 116, thereby allowing the user device A 106 to utilize those applications or services 144, 148. These additional applications or services may be downloaded or otherwise retrieved from an external source based upon data stored in the records 214 and 218. For example, in the case of the multifunction device 102, the records 214 and 218 may direct retrieval of application Z 144 or service B 148 from a server (not shown) hosted by the manufacturer or service provider associated with the multifunction device 102.

It will be appreciated that application X 140, application Y 142 and/or service A 146 resident in memory 116 may be initiated via a single touch point (i.e., tag 104) utilizing the MUX component 138. That is, from the point of view of each application 140, 142, or service 146, the initiation is no different than being launched or initiated by a dedicated NFC tag 104, i.e., application X 140 or application Y 142 or service A 146 does not realize or otherwise factor in the intermediary actions of the NFC MUX component 138. Thereafter, any reads or writes the application X, Y, 140, 142 or service A 146 requires with respect to the tag 104 are undertaken via the NFC MUX component 138.

Similarly, when a user brings the user device B 108 into proximity with the tag 104, the first record on the tag 104, i.e., the NFC MUX record 208 is read in accordance with NFC communications protocols. The processor 126 then initiates the client NFC MUX component 138 resident on the user device B 108. In the event that the user device B 108 does not currently have the NFC MUX component 138 already installed in memory 126, the user may be prompted to download the component 138 from an external source, e.g., a URL or other link associated with the record 208 is read by the processor 126 to identify the location of the NFC MUX component 138.

After installation of the NFC MUX component 138, the user may be prompted to perform an NFC connection, whereupon the first record 208 of the tag 104 is read. The client NFC MUX component 138 recently installed is then initiated to facilitate subsequent interactions with the tag 104. Accordingly, the NFC MUX component 138 reads the subsequent records 210-218 stored in memory 204 of the tag 104 in accordance with NFC communication protocols. Application X 140, application Z 144, or service B 148 having the application X record 210, application Z record 214, and service B record 218 on the tag 104 is accordingly acted upon via the NFC MUX component 138, i.e., those applications 140, 144, and service 148 are initiated by the component 138 utilizing the data stored in the associated record 210, 214, 218. As discussed above, those records, i.e., application Y record 212 and service A record 216, of the tag 104 for which no application or service is resident in memory 126 of the user device B 108, are read by the NFC MUX component 138. The user may then be prompted to install corresponding applications 142 and 146 from an exterior source, e.g., a server, network location, or the like, as indicated by the data stored in the application Y record 212 or service A record 216 stored on the tag 104.

Accordingly, it will be appreciated that the systems and methods set forth above and described below enable two different people, i.e., user device A 106 and user device B 108, to walk up to a device 102, i.e., the NFC tag 104, touch the tag 104, and get different behaviors. Different information will be given to the user devices 106 and 108 off the NFC tag 104, and when the user devices 106 and 108 write information back to the tag 104, both those sets of data will be preserved in the tag 104. Such information may include, for example, user ID's, passwords, the serial number of a device, the URL of the service where the application has to go to get some information. Accordingly, the data to be stored on the tag 104 is dependent upon the application, and the subject systems and methods are applicable to any such application and/or data.

Stated another way, the client NFC multiplexing component 138 is capable of handing out the appropriate record 210-218 to the appropriate application or service 140-148 and write back to the appropriate record 210-218 from the application 140-148. Accordingly, the individual applications 140-148 are not made aware of the multiple records 208-218 on the NFC tag 104, and act as each application 140-148 is individually reading and writing to an NFC tag 104. Thus, all NFC Tag reading and writing is handled by NFC multiplexing component 138 to insure the correct application data is accessed and that data records on the NFC Tag 104 from other applications and/or services 140-148 are maintained.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
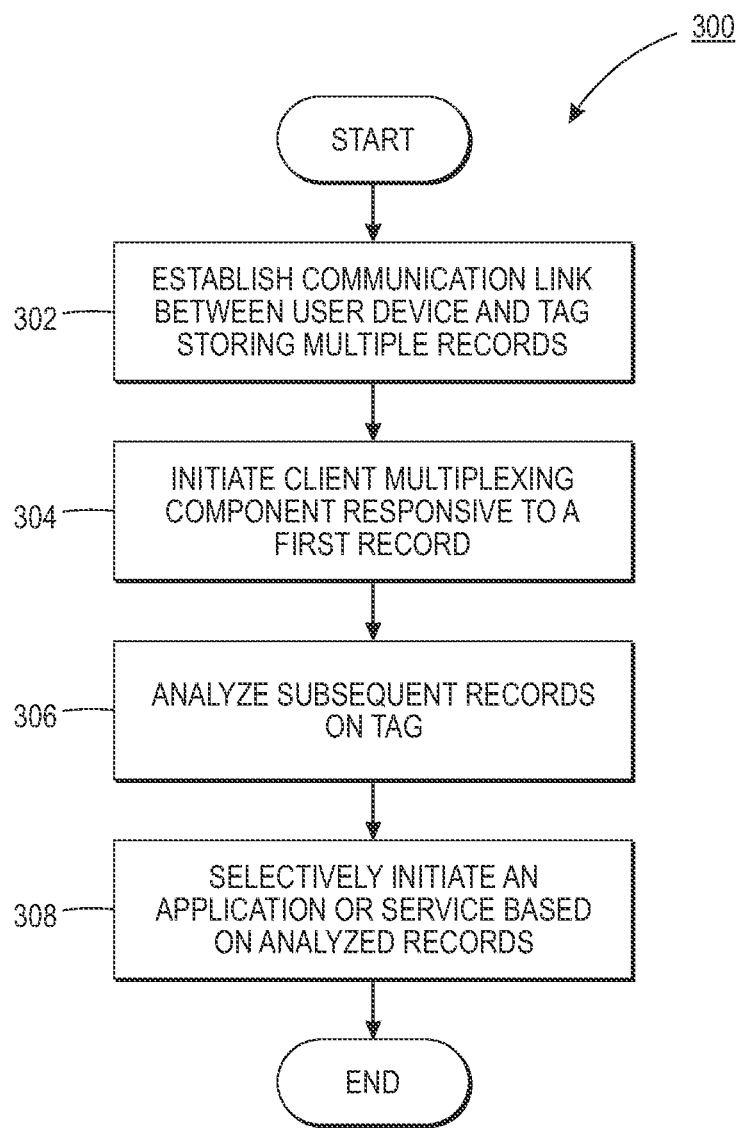
FIG. 3 is a flowchart that illustrates one aspect of the method for mapping multiple applications from a single tag according to an exemplary embodiment.
Figure 4:
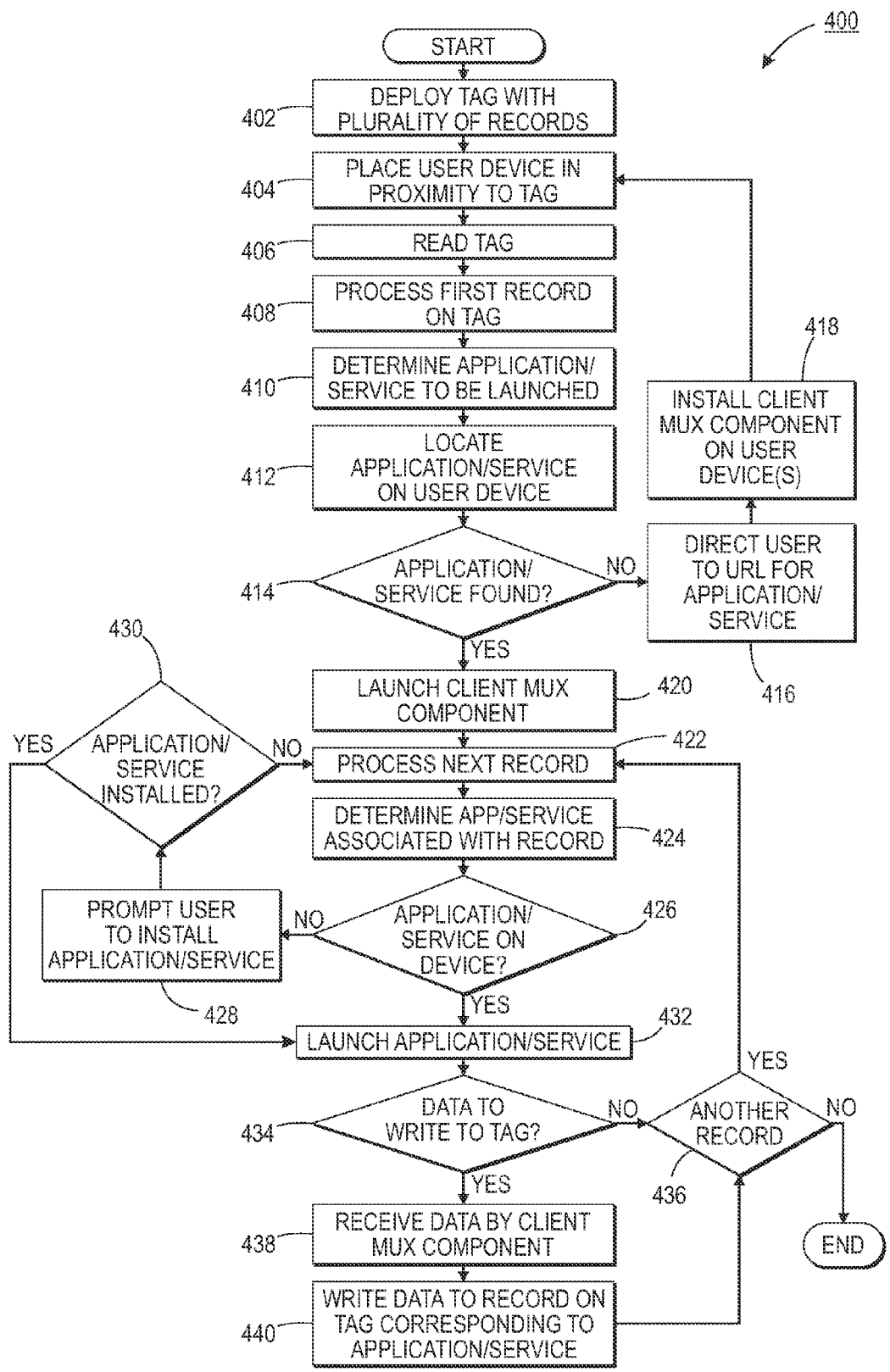
FIG. 4 is a flowchart that illustrates another aspect of the method for mapping multiple applications from a single tag according to an exemplary embodiment.

Turning now to FIG. 3, there is shown an exemplary method 300 for mapping multiple applications from a single tag. Reference is made hereinafter after to implementation of the method 300 with respect to a multifunction device 102 for example purposes. The method 300 depicted in FIG. 3 represents the interaction of a user device A or B 106 or 108 and the tag 104. FIG. 4, discussed below, depicts a more detailed exemplary method 400 for mapping multiple applications from a single tag, e.g., initiating multiple applications on different user devices 106 and 108 using a single NFC tag 104.

The method 300 of FIG. 3 begins at 302, whereupon a communications link is established between a user device 106 or 108 and the tag 104, which stores multiple intent records 208-218. As discussed above, each intent record 208-218 may correspond to an action or data that is to be initiated or processed by a specific application 138-148 resident in memory 116 or 128 of respective user devices 106 or 108, or capable of being downloaded and operable on such user devices 106 or 108. At 304, the processor 114 or 126 of the user device 106 or 108 and initiates a client NFC multiplexing component 138 in response to the first record of the tag 104, i.e., the client NFC MUX record 208. It will be appreciated that the NFC protocols may be utilized to read and process the first record 208, i.e., the standard NFC dispatch system, as referenced above.

At 306, the subsequent records 210-218 of the tag 104 are analyzed by the client NFC multiplexing component 138. That is, the client NFC multiplexing component 138 reads each subsequent record 210-218 stored in memory 208 of the tag 104 in accordance with suitable communications standards. The client NFC multiplexing component 138 then selectively initiates an application 140-144 or service 146-148 on the user device 106 or 108 based upon the corresponding records 210-218 of the tag 104 at 308. That is, the client NFC multiplexing component 138 determines the application or services 140-148 resident on a user device 106 or 108, which correspond to records 210-218 of the tag 104, and selectively initiates one or more of these applications/services 140-148 in response thereto. It will be appreciated that the selective initiation of an application 140-144 or service 146-148 may be based upon a configuration of the client NFC multiplexing component 138, a configuration of the user device 106 or 108, a role assigned to the user device 106 or 108, a time of day, etc.

FIG. 4 illustrates the method 400 whereby different user devices 106 and 108 may launch different applications/services 140-148 from a single tag 104, i.e., a single touch point on the multifunction device 102 may map multiple disparate applications for initiation on multiple disparate user devices 106 and 108. At 402, an NFC tag 104 is deployed on a product, i.e., the multifunction device 102, which tag 104 stores a plurality of intent records 208-210. Each of these records 208-210 may map to a different application or service 140-148 to be launched on a user device 106 or 108. At 404, the user device A 106 or the user device B 108 is placed into close physical proximity with the tag 104 deployed on the multifunction device 102. It will be appreciated that the proximity of the user device 106 or 108 to the tag 104 may be actual physical contact, or a close distance in accordance with the proximity limitations/requirements of the short-range communications protocol used, e.g., NFC, BLUETOOTH, etc. Thus, at 404, a bi-directional communications link is established between the user device 106 or 108 and the tag 104.

The processor 114 or 126 of the corresponding user device 106 or 108 then reads the tag 104 at 406 in accordance with the protocols associated with the communications standard utilized. That is, the user device 106 or 108 reads all records 208-218 stored in memory 204 of the tag 104. The first record 208 read from the tag 104 is then processed at 408 by the user device 106 or 108. Accordingly, NFC protocols may indicate that the first record 208 is acted upon prior to processing each subsequent record 210-218 on the tag 104. As previously discussed, the first record stored on the tag 104 deployed at 402 is the client NFC multiplexing record 208. The processor 114 or 126 of the user device 106 or 108 then determines at 410, which component, application or service 138-148 is to be launched or utilized based upon the first record 208.

The component, application or service 138-148 associated with the first record 208 is then located on the user device 106 or 108 at 412. As shown in FIGS. 1-2, the first record 208 corresponds to the client NFC multiplexing component 138. Accordingly, the client NFC multiplexing component 138 is located in memory 116 or 128 of the respective user device 106 or 108. A determination is then made at 414 whether the component 138 has been located on the user device 106 or 108. That is, a determination is made whether the component 138 associated with the first record 208 on the tag 104 is present and available on the user device 106 or 108. Upon a negative determination at 414, operations proceed to 416, whereupon the user associated with the user device 106 or 108 is directed to a location for downloading the client NFC multiplexing component 138. In some embodiments, this direction may be a URL to a public or private location having the component 138 available for downloading. The client NFC multiplexing component 138 is then downloaded and installed on the corresponding user device 106 or 108 at 416, whereupon operations return to 404 for re-establishment of the communications link between the user device 106 or 108 and the tag 104.

Upon a determination at 414 that the client NFC multiplexing component 138 is available on the user device 106 or 108, operations progress to 420, whereupon the client NFC multiplexing component 138 is launched on the corresponding user device 106 or 108. The client NFC multiplexing component 138 then processes the next record 210 on the tag 104 at 422 and determines the application or service 140-148 associated with that record at 424. A determination is then made at 426 whether the determined application or service 140-148 associated with the record 210 is present on the user device 106 or 108. That is, the client NFC multiplexing component 138 reads the application X record 210 and determines whether application X 140 is present on the user device 106 or 108. As shown in FIG. 1, application X 140 is present on both user devices 106 and 108. Accordingly, application X 140 is launched by the client NFC multiplexing component 138 in accordance with the application X record 210 read from the tag 104 at 432.

A determination is then made at 434 whether any data needs to be written to the tag 104 by application X 140. Upon a positive determination, information to be written to the tag 104 is received from application X 140 by the NFC multiplexing component 138 at 438. The data is then written to the application X record 210 on the tag 104 by the client NFC multiplexing component 138 at 440. In the event that no data needs to be written, as determined at 432, or after completing the writing at 440, operations proceed to 436, whereupon a determination is made whether another record, i.e., 212-218 remains on the tag 104. Upon a positive determination, operations return to 422, whereupon the next record 212 on the tag 104 is processed by the client NFC multiplexing component 138. It will be appreciated that the client NFC multiplexing component 138 may be configured to sequentially process each record 210-212 on the tag 104, may be configured to extend priority of processing to specific (e.g., flagged) records, or a combination thereof.

At 424, the application or service associated with the next record 212 is determined by the client NFC multiplexing component 138. As illustrated in FIGS. 1-2, the next record is the application Y record 212 which corresponds to the application Y 142. At 426, the client NFC multiplexing component 138 determines whether application Y 142 is on the user device 106 or 108. As shown, application Y 142 is present on the user device A 106, but is not present on the user device B 108. Accordingly, with respect to the user device A 106, operations proceed as discussed above with respect to the application X record 210. However, with respect to the user device B 108, the determination at 426 indicates that the corresponding application Y 142 is not present on the user device B 108. Accordingly, operations proceed to 428.

At 428, the client NFC multiplexing component 138 prompts the user associated with user device B 108 to install application Y 142 which corresponds to the next record being processed, i.e., application Y record 212. In one embodiment, the NFC multiplexing component 138 retrieves information from the application Y record 212 indicating a suitable source for application Y 142, e.g., a network location, URL of a download location, or the like. A determination is then made at 430 whether the application or service, i.e., application Y 142, has been installed on the user device B 108. In the event that installation of the application or service is unsuccessful, or the user does not authorize such installation, operations return to 422, whereupon the next record on the tag 104, i.e., the application Z record 214, is analyzed as set forth above. Upon a determination that the application or service, i.e., application Y 142 has been successfully installed on the user device B 108, operations proceed to 432, whereupon the newly installed application Y 142 is launched or otherwise activated on the user device B 108 by the client NFC multiplexing component 138. Steps 422-440 are repeated by the client NFC multiplexing component 138 with respect to each remaining record 214-218 in memory 204 of the tag 104 with respect to each user device 106 and 108. Thus, it will be appreciated that disparate user devices 106 and 108 may each access the same NFC tag 104 and resulting from this access, launch or perform independent and distinct applications or services.

Turning now to FIG. 5, there is shown an alternate implementation 500 of the method 400 of FIG. 4 incorporating role-based processing of records 208-218 of a tag 104. That is, the user device 106 or 108 may be associated with a role (e.g., an end user of document services), such that when the tag 104 is read the client NFC multiplexing component 138 will ignore any records 208-218 not associated with the role of the user device 106 or 108 (e.g., to log into the device or to submit a document processing job). In such an implementation, other applications (e.g., retrieve usage information from the device) would not be invoked even if they are installed since it is an application associated with an administrator.

At 502, an NFC tag 104 is deployed on a product, i.e., the multifunction device 102, which tag 104 stores a plurality of intent records 208-210. Each of these records 208-210 may map to a different application or service 140-148 to be launched on a user device 106 or 108. At 504, the user device A 106 or the user device B 108 is placed into close physical proximity with the tag 104 deployed on the multifunction device 102, so as to establish a bi-directional communications link between the user device 106 or 108 and the tag 104.

The processor 114 or 126 of the corresponding user device 106 or 108 then reads the tag 104 at 506 in accordance with the protocols associated with the communications standard utilized. The first record 208, i.e., the client NFC multiplexing record 208, the read from the tag 104 is then processed at 508 by the user device 106 or 108. The processor 114 or 126 of the user device 106 or 108 then determines at 510, which component, application or service 138-148 is to be launched or utilized based upon the first record 208.

The component, application or service 138-148 associated with the first record 208 (i.e., the client MFC multiplexing component 138) is then located on the user device 106 or 108 at 512. A determination is then made at 514 whether the client NFC multiplexing component 138 has been located on the user device 106 or 108. Upon a negative determination at 514, operations proceed to 516, whereupon the user associated with the user device 106 or 108 is directed to a location for downloading the client NFC multiplexing component 138. In some embodiments, this direction may be a URL to a public or private location having the component 138 available for downloading. The client NFC multiplexing component 138 is then downloaded and installed on the corresponding user device 106 or 108 at 518. At 520, the client NFC multiplexing component 138 is configured for the desired role of the user device 106 or 108, as discussed above. Thereafter, operations return to 504 for re-establishment of the communications link between the user device 106 or 108 and the tag 104.

Upon a determination at 514 that the client NFC multiplexing component 138 is available on the user device 106 or 108, operations progress to 522, whereupon the client NFC multiplexing component 138 is launched on the corresponding user device 106 or 108. The client NFC multiplexing component 138 then processes the next record 210 on the tag 104 at 524 and determines the application or service 140-148 associated with that record at 526. A determination is then made at 528 whether the application or service 140-148 corresponding to the next record 210 is associated with the role of the user device 106 or 108. When the application or service 140-148 corresponding to the next record 210 is not associated with the role of the user device 106 or 108 (e.g., it is an administrative application), operations return to 524, whereupon the next record 212 is processed as discussed above.

Upon a positive determination at 528, operations proceed to 530, whereupon a determination is made whether the determined application or service 140-148 associated with the record 210 is present on the user device 106 or 108.

Upon a negative determination at 530, operations proceed to 532, whereupon the user is prompted to install the application or service 140 associated with the record 210. A determination is then made at 534 whether the application or service 140-148 associated with record 210 was installed. A negative determination returns operations to 524, whereupon the next record 212 is processed as discussed above. After a successful installation at 534, or upon a determination at 530 that the application or service 140-148 is on the user device 106 or 108, operations proceed to 536, whereupon the application or service 140-148 associated with the record 210 is launched. Application or service 140-148 processing then occurs at 538 and a determination is made at 540 whether data is needed to be read from or written to the tag 104 with respect to the record 210 associated with the application or service 140-148. Upon a negative determination at 540, i.e., no data is needed to be read from or written to the tag 104, operations proceed to 546 as discussed below.

Upon a positive determination at 540, operations proceed to 542, whereupon the data associated with the application 140-148 is processed by the client NFC multiplexing component 138, e.g., collected, reviewed, encrypted, etc. Data to be read from or written to the tag 104 corresponding to the application 140-148 is then read from or written to the tag 104 by the NFC multiplexing component 138 at 544. That is, data is written to the record 210 on the tag 104 by the client NFC multiplexing component 138. A determination is then made at 546 whether the application or service 140-148 associated with the record 210 has completed processing. Upon a negative determination, operations return to 538 and progress thereafter as discussed above.

In the event that the application or service 140-148 has completed, as determined at 546, operations proceed to 548, whereupon a determination is made whether another record, i.e., 212-218 remains on the tag 104. Upon a positive determination, operations return to 524, whereupon the next record 212 on the tag 104 is processed by the client NFC multiplexing component 138. It will be appreciated that the client NFC multiplexing component 138 may be configured to sequentially process each record 210-212 on the tag 104, may be configured to extend priority of processing to specific records, or a combination thereof.

Steps 524-548 are repeated by the client NFC multiplexing component 138 with respect to each remaining record 214-218 in memory 204 of the tag 104 with respect to each user device 106 and 108. Upon a determination at 548 that no additional records remain for processing, operations with respect to FIG. 5 terminate. Thus, it will be appreciated that disparate user devices 106 and 108 may each access the same NFC tag 104 and resulting from this access, launch or perform independent and distinct applications or services.

In accordance with one embodiment, the systems and methods set forth above may incorporate additional security features, in addition to the necessity of the NFC enabled device being brought into contact with or close proximity to the tag. Furthermore, various NFC modalities may be utilized herein, such that the tag can be read/write, read only, or read only unless a special tag writing device is used. In such embodiments, writing and reading of the NFC tag can incorporate encryption offering additional tag content protections.

It will be appreciated that the systems and methods set forth in FIGS. 1-5 enable the use of a single touch point (i.e., tag) on a product programmed to access a set of vendor features or information. The applications associated with these features can be automatically launched, disable, or presented in the display of an NFC enabled device, allowing the associated user to decide if they should be run. Data needed for specific purposes with respect to the product, e.g., inventory, trouble shooting, usage, etc., can also be stored on the tag.

It will further be appreciated that while illustrated with respect to a multifunction device 102, the systems and methods set forth herein are equally applicable to a freestanding tag, e.g., a tag affixed to the reception desk of a doctor's office. The doctor's device could touch the tag resulting in today's schedule being displayed whereas an arriving patient touching the tag could result in the required forms to complete being presented on the device, a patient with completed forms could touch the tag to securely transmit the forms to the receptionist's computer.

The method illustrated in FIGS. 1-5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-5, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for mapping multiple applications from a single tag, comprising:
    establishing, via a user device, a communications link with the tag, the tag storing a plurality of records, each record corresponding to an application or a service;
    initiating a multiplexing component on the user device responsive to a first record of the plurality thereof;
    analyzing each additional record of the plurality of records to identify a flag associated with a set of flagged records on the tag by the multiplexing component;
    determining a respective application or service on the user device corresponding to each of the set of identified flagged records;
    selectively initiating by the multiplexing component on the user device each respective application or service corresponding to each of the set of identified flagged records;
    establishing a communications link with a second user device;
    initiating the multiplexing component on the second user device responsive to the first record of the plurality thereof;
    analyzing each additional record of the plurality of records by the multiplexing component on the second user device; and
    selectively initiating, via the multiplexing component, at least one application or service responsive to at least one additional record on the second user device, wherein the at least one application or service is different from the at least one application or service selectively initiated on first user device.

2. The method of claim 1, wherein analyzing each additional record further includes:
    determining each application or service resident on the user device corresponding to a respective additional record; and
    selectively initiating by the multiplexing component on the user device each determined application or service in accordance with its respective record on the tag.

3. The method of claim 2, further comprising:
    generating a menu of the determined application or service on the user device corresponding to respective additional records; and receiving a selection of at least one application or service in the menu thereof, wherein the selected application or service is selectively initiated via the multiplexing component.

4. The method of claim 3, wherein at least one selectively initiated application or service processes data stored in corresponding record.

5. The method of claim 4, further comprising:
receiving write data by the multiplexing component from the at least one selectively initiated application or service; and
writing, by the multiplexing component, the received write data to the tag in association with the record corresponding to the at least one selectively initiated application or service.

6. The method of claim 5, wherein the communications link is a near field communication (NFC) channel.

7. The method of claim 5, further comprising:
receiving write data by the multiplexing component from the at least one selectively initiated application or service; and
writing, by the multiplexing component, the received write data to the tag in association with the flagged record corresponding to the at least one selectively initiated application or service.

8. A computer program product comprising a non-transitory recording medium storing instructions, which when executed on a computer causes the computer to perform the method of claim 1.

9. A system comprising memory storing instructions for performing the method of claim 1, and a processor in communication with the memory which implements the instructions.

10. A system for mapping multiple applications from a single tag, comprising:
a user device, including:
a client multiplexing component configured to interact with an associated tag, the tag including a plurality of intent records, each record corresponding to at least one of an application or a service, wherein a first record corresponds to the client multiplexing component;
an NFC interface configured to communicate with the associated tag;
memory which stores instructions:
establishing, via the NFC interface, a bi-directional communication link with the associated tag,
determining whether the client multiplexing component is resident on the user device corresponding to a first record of the plurality thereof,
responsive of a determination the client multiplexing component is not present, identifying a location associated with the first record corresponding to a location for retrieving the client multiplexing component,
retrieving the client multiplexing component from the identified location,
initiating the client multiplexing component upon retrieval thereof,
identifying a flag associated with a set of flagged records on the associated tag by the client multiplexing component;
determining a respective application or service resident on the user device corresponding to each of the set of identified flagged records;
selectively initiating by the client multiplexing component on the user device each respective application or service corresponding to each of the set of identified flagged records; and
a processor in communication with the memory which executes the instructions.

11. The system of claim 10, wherein the associated tag is an NFC tag, comprising:
a transceiver;
memory storing the plurality of intent records, each record corresponding to a respective component, application, or service; and
a processor in communication with the memory, wherein the memory stores instructions executed by the processor:
communicating the first record to the user device via the bi-directional communication link, and
responsive to the client multiplexing component of the user device, communicating a plurality of subsequent records to the user device.

12. The system of claim 11, wherein the memory of the associated tag further stores instructions executed by the processor:
receiving data from the client multiplexing component corresponding to at least one of the plurality of intent records, and
storing the received data from the client multiplexing component in the at least one of the plurality of intent records corresponding thereto.

13. The system of claim 12, wherein the memory of the associated tag further stores instructions executed by the processor:
selectively initiating the at least one application or service by the client multiplexing component responsive to a role associated with the user device.

14. A computer-implemented method for mapping multiple applications from a single tag, comprising:
receiving, by a user device having a processor, a first record stored on an associated tag via a near field communications connection, the first record associated with a client multiplexing component;
initiating the client multiplexing component on the user device;
sequentially reading each of a plurality of subsequent records stored on the associated tag by the client multiplexing component, each record corresponding to at least one of an application or a service;
analyzing each of the plurality of subsequent records to identify each subsequent record without a corresponding application or service on the user device;
determining a respective location associated with each application or service not resident on the user device from the record identifying the corresponding application or service;
retrieving each application or service not resident on the user device responsive to each respective location; and
initiating each retrieved application or service by the client multiplexing component upon installation thereof on the user device in accordance with the read subsequent record.

15. The computer-implemented method of claim 14, further comprising:
identifying each application or service resident on the user device corresponding to a respective subsequent record on the associated tag; and
initiating each identified application or service by the client multiplexing component resident on the user device.

16. A method for mapping multiple applications from a single tag, comprising:

establishing, via an NFC interface of a user device, a bi-directional communications link with the tag, the tag storing a plurality of records, each record corresponding to an application or a service;

determining whether a client multiplexing component is resident on the user device corresponding to a first record of the plurality thereof;

responsive of a determination the client multiplexing component is not present, identifying a location associated with the first record corresponding to a location for retrieving the client multiplexing component;

retrieving the client multiplexing component from the identified location;

initiating the client multiplexing component on the user device upon retrieval thereof;

analyzing each additional record of the plurality of records to identify a flag associated with each of a set of records on the tag by the client multiplexing component;

determining a respective application or service on the user device corresponding to each of the set of identified flagged records;

selectively initiating by the client multiplexing component on the user device each respective application or service corresponding to each of the set of identified flagged records.

17. A method for mapping multiple applications from a single tag, comprising:

establishing, via a user device, a communications link with the tag, the tag storing a plurality of records, each record corresponding to an application or a service;

initiating a multiplexing component on the user device responsive to a first record of the plurality thereof;

analyzing each additional record of the plurality of records to identify a flag associated with each of a set of records on the tag by the multiplexing component;

determining a respective application or service on the user device corresponding to each of the set of identified flagged records;

selectively initiating by the multiplexing component on the user device each respective application or service corresponding to each of the set of identified flagged records;

identifying each of a plurality of subsequent records without a corresponding application or service on the user device;

determining a respective location associated with each application or service not resident on the user device;

retrieving each application or service not resident on the user device responsive to each respective location; and initiating each retrieved application or service by the multiplexing component upon installation thereof on the user device in accordance with read subsequent record.

18. A system for mapping multiple applications from a single tag, comprising:

a first user device, including:

a client multiplexing component configured to interact with an associated tag, the tag including a plurality of intent records, each record corresponding to at least one of an application or a service, wherein a first record corresponds to the client multiplexing component;

memory which stores instructions:

initiating the client multiplexing component responsive to reading the first record stored on the associated tag, identifying a flag associated with each of a set of records on the associated tag by the client multiplexing component;

determining a respective application or service resident on the first user device corresponding to each of the set of identified flagged records;

selectively initiating by the client multiplexing component on the first user device each respective application or service corresponding to each of the set of identified flagged records; and a processor in communication with the memory which executes the instructions; and a second user device, including:

the client multiplexing component;

memory stores instructions:

initiating the client multiplexing component on the second user device responsive to the first record of the plurality thereof, analyzing each additional record of the plurality of intent records by the client multiplexing component on the second user device, and selectively initiating, via the client multiplexing component, at least one application or service responsive to at least one additional record on the second user device, wherein the at least one application or service is different from the at least one application or service selectively initiated on the first user device; and a processor in communication with the memory of the second user device which executes the instructions.

19. A system for mapping multiple applications from a single tag, comprising:

a user device, including:

a client multiplexing component configured to interact with an associated tag, the tag including a plurality of intent records, each record corresponding to at least one of an application or a service, wherein a first record corresponds to the client multiplexing component;

memory stores instructions:

initiating the client multiplexing component responsive to reading the first record stored on the associated tag, identifying a flag associated with each of a set of records on the associated tag by the client multiplexing component;

determining a respective application or service resident on the user device corresponding to each of the set of identified flagged records;

selectively initiating by the client multiplexing component on the user device each respective application or service corresponding to each of the set of identified flagged records, identifying each of a plurality of subsequent records without a corresponding application or service on the user device, determining a respective location associated with each application or service not resident on the user device, retrieving each application or service not resident on the user device responsive to each respective location, initiating each retrieved application or service by the client multiplexing component upon installation thereof on the user device in accordance with read subsequent record; and a processor in communication with the memory which executes the instructions.

20. A computer-implemented method for mapping multiple applications from a single tag, comprising:

receiving, by a user device having a processor, a first record stored on an associated tag via a near field communications connection, the first record associated with a client multiplexing component;

initiating the client multiplexing component on the user device;

reading a subsequent record on the associated tag by the client multiplexing component, the subsequent record corresponding to at least one of an application or a service;

initiating the at least one of an application or a service on the user device by the client multiplexing component responsive to the read subsequent record;

establishing a communications link with a second user device;

initiating the client multiplexing component on the second user device responsive to the first record of plurality thereof;

analyzing each additional record of plurality of records by the client multiplexing component on the second user device; and selectively initiating, via the client multiplexing component, at least one application or service responsive to at least one additional record on the second user device, wherein the at least one application or service is different from the at least one application or service selectively initiated on first user device.

21. A computer-implemented method for mapping multiple applications from a single tag, comprising:

receiving, by a user device having a processor, a first record stored on an associated tag via a near field communications connection, the first record associated with a client multiplexing component;

analyzing the first record to identify a client multiplexing component corresponding thereto;

determining whether the client multiplexing component is resident on the user device corresponding to a first record of plurality thereof;

responsive of a determination the client multiplexing component is not present, identifying a location associated with the first record corresponding to a location for retrieving the client multiplexing component;

retrieving the client multiplexing component from the identified location;

initiating the client multiplexing component on the user device upon retrieval thereof;

reading a subsequent record on the associated tag by the client multiplexing component, the subsequent record corresponding to at least one of an application or a service; and initiating the at least one of an application or a service on the user device by the client multiplexing component responsive to the read subsequent record.

* * * * *